US011009051B2

(12) United States Patent
Biwersi et al.

(10) Patent No.: US 11,009,051 B2
(45) Date of Patent: May 18, 2021

(54) VALVE

(71) Applicant: HYDAC SYSTEMS & SERVICES GMBH, Sulzbach (DE)

(72) Inventors: Sascha Alexander Biwersi, Mettlach (DE); Christoph Stoenner, St. Ingbert (DE); Michael Timothy Teiga, Loudonville, OH (US)

(73) Assignee: HYDAC SYSTEMS & SERVICES GMBH, Sulzbach (DE)

( * ) Notice: Subject to any disclaimer, the term of this patent is extended or adjusted under 35 U.S.C. 154(b) by 90 days.

(21) Appl. No.: 16/480,731

(22) PCT Filed: Apr. 27, 2018

(86) PCT No.: PCT/EP2018/060865
§ 371 (c)(1),
(2) Date: Jul. 25, 2019

(87) PCT Pub. No.: WO2018/206316
PCT Pub. Date: Nov. 15, 2018

(65) Prior Publication Data
US 2019/0390690 A1  Dec. 26, 2019

(30) Foreign Application Priority Data
May 11, 2017 (DE) ............ 10 2017 004 531.3

(51) Int. Cl.
*F15B 13/04* (2006.01)
*F16K 11/07* (2006.01)
(Continued)

(52) U.S. Cl.
CPC ...... *F15B 21/0427* (2019.01); *F15B 13/0402* (2013.01); *F16K 11/07* (2013.01);
(Continued)

(58) Field of Classification Search
CPC ............ F15B 13/0402; F15B 2013/008; F16K 11/07; F16K 11/0708; F16K 11/0716; Y10T 137/86702
See application file for complete search history.

(56) References Cited

U.S. PATENT DOCUMENTS 4,059,042 A   11/1977  Bridwell et al.
4,220,174 A * 9/1980  Spitz ............... F16K 11/0708
                                                   137/271
(Continued)

FOREIGN PATENT DOCUMENTS

DE         36 39 533    9/1987
DE    10 2016 011 860   4/2018
(Continued)

OTHER PUBLICATIONS

International Search Report (ISR) dated Aug. 3, 2018 in International (PCT) Application No. PCT/EP2018/060865.

*Primary Examiner* — Kelsey E Cary
(74) *Attorney, Agent, or Firm* — Wenderoth, Lind & Ponack, L.L.P.

(57) ABSTRACT

A valve includes a valve housing (2) for transport of a heatable fluid such as hydraulic oil. The valve housing has at least one utility connection (A, B), at least one pressure supply connection (P), and at least one return connection (T1, T2). A control slide (6) is guided in the valve housing (2) in a longitudinally displaceable manner. In at least one position of the control slide (6), the pressure supply connection (P) is at least partially separated from the utility connection (A, B), and the heatable fluid arrives, proceeding from this pressure supply connection (P) and via a heat-emitting connection in the control slide (6), at the at least one return connection (TI, T2) as a loss volume flow. The loss volume flow serves as a heat source and heats at least regions of the control slide (6).

11 Claims, 2 Drawing Sheets

(51) Int. Cl.
  *F15B 21/0427*    (2019.01)
  *F15B 13/00*      (2006.01)

(52) U.S. Cl.
  CPC ... *F15B 2013/008* (2013.01); *F15B 2211/253* (2013.01); *F15B 2211/6654* (2013.01); *F16K 11/0716* (2013.01)

(56) References Cited

U.S. PATENT DOCUMENTS

| | | | |
|---|---|---|---|
| 4,972,762 | A | 11/1990 | Kubik |
| 6,182,697 | B1 * | 2/2001 | Parker ..................... F15B 13/01 |
| | | | 137/625.16 |
| 6,397,890 | B1 * | 6/2002 | Mickelson .......... F15B 13/0402 |
| | | | 137/625.34 |
| 2005/0082427 | A1 | 4/2005 | Seung |
| 2018/0087547 | A1 | 3/2018 | Lesage et al. |
| 2018/0163888 | A1 * | 6/2018 | Ishikawa ................ F16K 31/06 |

FOREIGN PATENT DOCUMENTS

| | | |
|---|---|---|
| EP | 1 495 961 | 1/2005 |
| EP | 2 068 004 | 6/2009 |
| EP | 3 299 638 | 3/2018 |
| WO | 2008/098559 | 8/2008 |
| WO | 2018/059727 | 4/2018 |

* cited by examiner

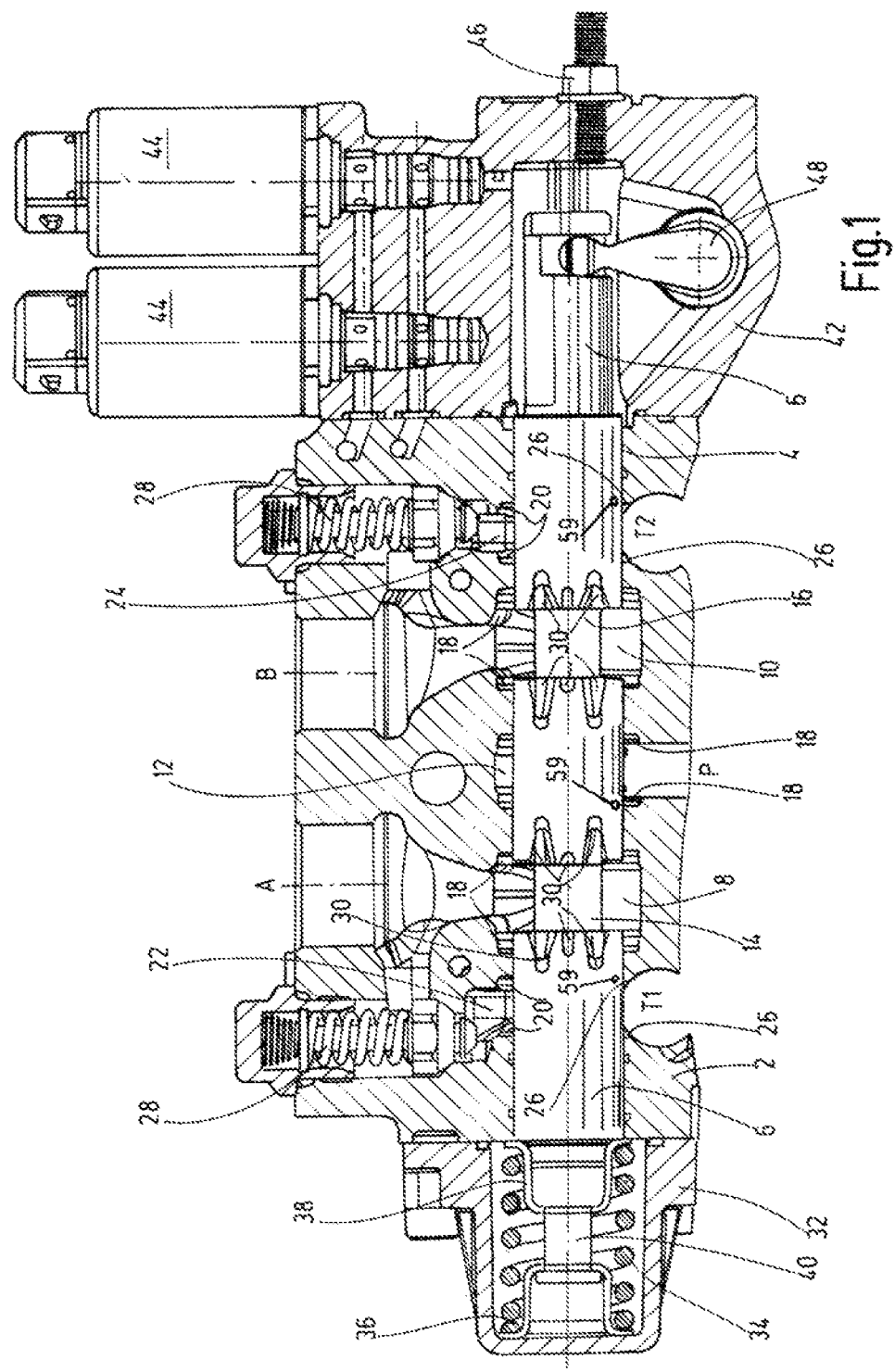

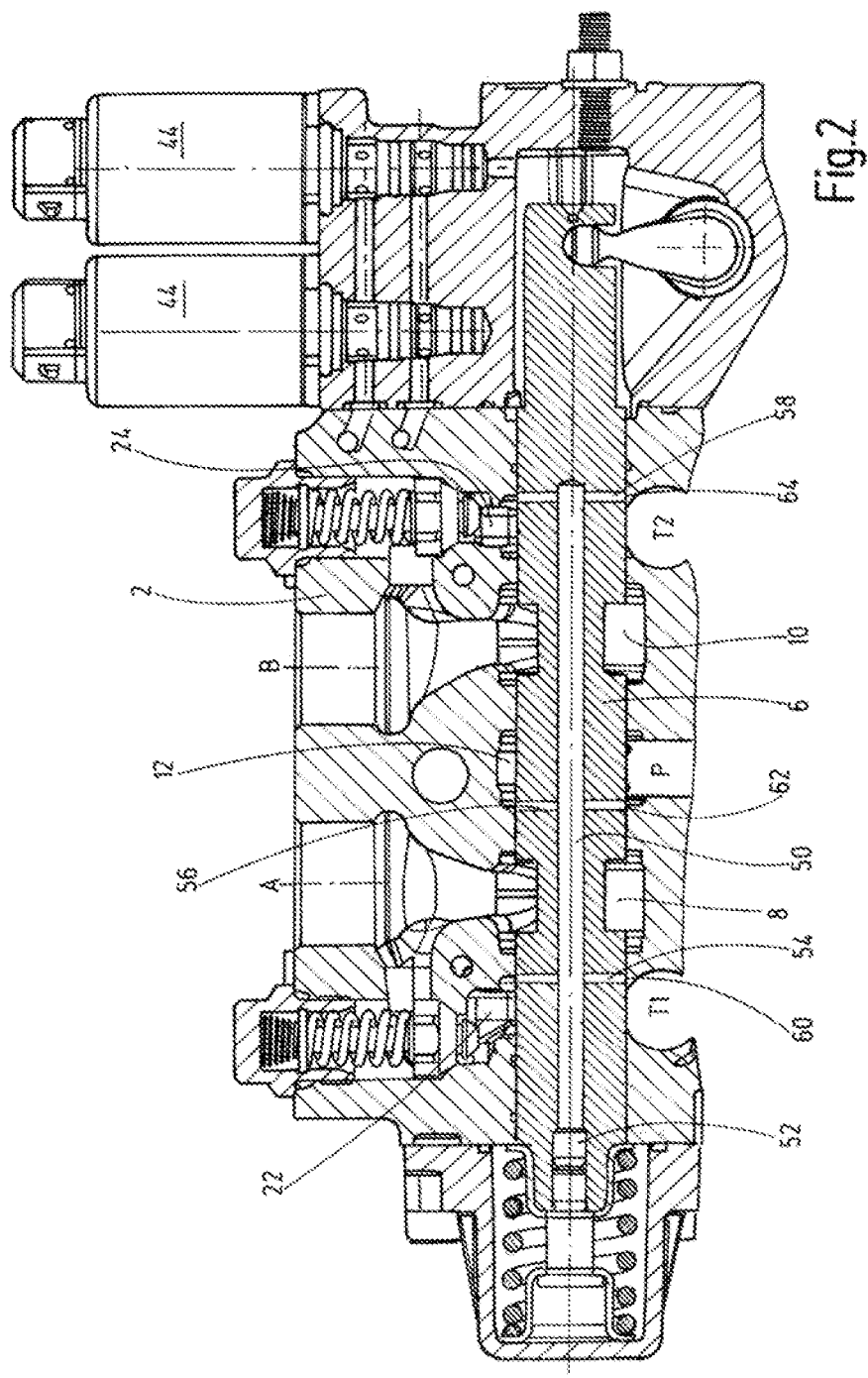

VALVE

FIELD OF THE INVENTION

The invention relates to a valve having a valve housing for transporting a heatable fluid such as hydraulic fluid. The valve housing has at least one utility port, at least one pressure supply port, and at least one return port. A valve spool that is guided in a longitudinally displaceable manner in the valve housing.

BACKGROUND OF THE INVENTION

WO 2008/098559 A1 discloses a control block having a plurality of control block elements. Each of the control block elements has a valve assembly for actuating a corresponding hydraulic consumer. The control block has an oil channel, through which an oil flow for controlling the temperature of at least one control block element flows independently of the actuation of the valve assembly. Even when a valve spool of the control block is not actuated for a prolonged period, it is thus possible to ensure that it is heated such that a jamming of the associated valve spool is prevented upon actuation of a valve.

In the prior art solution, provision is preferably made such that the oil flow is essentially constant, as in this manner a uniform heating of the valve housing can be ensured. However, maintaining a constant oil flow requires continuous pump output, which in turn requires energy. Because the valve spool is heated indirectly via the valve housing having the oil channel, the energy transfer from the valve housing to the valve spool inevitably leads to energy losses, which losses likewise increase the energy input required to heat the valve spool. It also takes time until the valve spool, starting from the valve housing, is heated. A jamming of the valve spool in the valve therefore cannot be reliably prevented, especially under cold starting conditions.

SUMMARY OF THE INVENTION

Starting from this prior art, an object of the invention is providing a solution that is an improvement over the prior art.

This object is basically achieved by a valve having, at least one position of the valve spool in which the pressure supply port is at least partially disconnected from the utility port. The heatable fluid then arrives, starting from this pressure supply port and via a heat-emitting connection in the valve spool, at the at least one return port as slippage or loss volume flow. The slippage serves as a heat source and heats at least areas of the valve spool, ensuring that the relevant areas of the valve spool are heated directly and quickly. This heating ensures that even under very cold conditions, the valve spool cannot jam in the valve housing during operation of the valve.

Because the slippage, which is preferably heated via a barrier device that serves as a fluid resistance, transfers heat directly due to friction to the ingoing and/or outgoing fluid in the valve spool, only a small flow rate is needed for "heating" the valve spool. This flow rate can be provided to the valve with low pump output and is otherwise stopped as soon as the valve ensures a pressure supply, starting from its pressure supply source, at its hydraulic utility port to which a hydraulic consumer such as a power cylinder can be hooked up. Because relatively high flow rates compared to the aforementioned slippage are generally needed for the actuation of such a hydraulic consumer in any case, the hydraulic valve, because it is operating under a load, will have already reached its desired operating temperature. That temperature counteracts a jamming of the valve spool, and thus, makes it unnecessary to provide a permanent volumetric flow as a heating medium for continuous heating, as is the case in the prior art.

In a preferred embodiment of the valve according to the invention, provision is made such that the slippage can be heated via a barrier device. The barrier device serves as a fluid resistance and transfers heat generated by friction to the fluid entering and/or exiting the valve spool. The resulting frictional heat can then be transferred to the fluid as a heat carrier in a particularly energy efficient manner.

In another preferred embodiment of the valve according to the invention, the barrier device has at least one type of control diaphragm or gap. The free diaphragm or gap cross section in the control mode results from a closing motion of the valve spool with respect to the valve housing in the area of the one pressure supply port and/or of the one return port, into which port or into which ports the heat emitting connection in the valve spool opens. Because the barrier device is integrated in the valve housing and is actuated by the movable valve spool in such a manner, the heat-generating and heat-emitting device is received in the valve in a particularly space-saving manner.

In another preferred embodiment of the valve according to the invention, provision is made such that, with increasing widening of the diaphragm or gap cross section of the one type of control diaphragm or gap at the one pressure supply port with simultaneous narrowing of the same at the one return port, a further type of control diaphragm with its free diaphragm or gap cross section in the control mode results from a closing motion of the valve spool with respect to the valve housing in the area of the one assignable utility port. The flow rate from this one pressure supply port to this one assignable utility port then increases. By each other type of control diaphragm or gap, a fluid flow to or from the corresponding utility port can be used as a type of further, additional barrier device in order to increase the input of heat into the fluid by the frictional heat generated by throttling the fluid.

In the valve according to the invention, the heat-emitting connection in the valve spool is preferably formed by a longitudinal channel, which in the control mode exits at least partially toward the one pressure supply port and the one return port by cross channels. The longitudinal and cross channel routing inside the valve spool leads to rapid heating of the valve spool such that heat input occurs directly on the valve spool to considerably reduce the tendency of the valve spool to stick and jam in the valve housing under cold operating conditions. The closing and opening of the one type of control diaphragm fluidically supports the respective closing and opening of the further type of control diaphragm and vice versa.

Other advantageous embodiments of the valve according to the invention are described below.

An individual pressure compensator provides a control pressure at the pressure supply port P of the valve, and thus, advantageously renders the slippage independent of the pump pressure. That pressure compensator can be arranged hydraulically upstream of the valve.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a side view of a valve according to an exemplary embodiment of the invention, partially in whole view and partially in a sectional view; and FIG. 2 is a side view in section of the valve of FIG. 1.

DETAILED DESCRIPTION OF THE INVENTION

The valve according to an exemplary embodiment of the invention shown in the figures has a valve housing 2. A valve spool 6 is displaceably guided in a longitudinal guide 4 of valve housing 2. Viewed toward the figures, the valve housing 2 is cut off at its lower end, and thus, is only illustrated in part for easier viewing. Fluid connection points, such as the two utility ports A, B, to which a hydraulic consumer in the form of, say, a power cylinder or hydraulic motor (not shown in any further detail can be connected), are formed in the valve housing 2. A centrally arranged pressure supply port P and two tank or return ports T1, T2 arranged adjacently thereto on the right and the left extend through the valve housing 2 on the side opposite the utility ports A, B.

At their respective ends facing away from the consumer, the two utility ports A, B open into a control chamber 8 or 10, respectively. At its upper end, the pressure supply port P opens into a further control chamber 12. The control chambers 8, 10, 12 encompass the outer circumference of the valve spool 6 inside the valve housing 2 and abut on the longitudinal guide 4. In the middle or neutral position of the valve spool shown in FIGS. 1 and 2, the fluid passage of the pressure supply port P is separated from the corresponding utility port A, B. Areas 14, 16 of the valve spool 6, which are reduced in diameter, are arranged completely inside the two control chambers 8 and 10, respectively. Each corresponding control chamber 8, 10, 12, viewed in the longitudinal alignment of the valve spool 6 inside the valve housing 2, in turn has two opposing cylindrical wall sections 18, which are essentially configured identically for all control chambers. Cylindrical wall sections 20, which are comparable in configuration to the wall sections 18, delimit two fluid chambers 22, 24, which according to the illustration in the figures do not encompass the valve spool 6 all of the way to the bottom. The lower annular sections 26 of the associated wall sections 20 open into the return ports T1, T2 and at least partially delimit the return ports at the edge. In addition, two pressure relief valves 28, which act as safety valves to prevent pressure overloading, open into the two fluid chambers 22, 24. The pressure supply port P opens into the valve housing 2 in a longitudinal direction within the drawing plane. The two return ports T1, T2 open into the valve housing 2 in a direction that is perpendicular to the drawing plane.

Individual control grooves 30, which are at least partially wedge-shaped, are formed on both sides of each recessed area 14, 16 of the valve spool 6, on the circumference of the valve spool 6. The free ends of the control grooves 30, facing one another, open into the associated control chambers 8 and 10, respectively, at least in the illustrated middle or neutral position of the valve spool 6. Depending upon the travel position of the valve spool 6, the other free end of a control groove 30 then moves, in a media-conducting manner, into the wall sections 18 of the further control chamber 12 or into the associated wall sections 20 of the two fluid chambers 22 or 24, respectively. The individual control grooves 30 of the valve spool 6, together with wall parts of the valve housing, which delimit the wall sections 20 of the fluid chambers 22, 24 and the wall sections 18 of the control chamber 12, then form control diaphragms or gaps, which shall henceforth be designated as first control diaphragms or gaps in order to distinguish them from additional or second control diaphragms or gaps, which shall be explained in more detail.

Viewed toward the figures, on its left end the valve housing 2 is provided with an end part 32, which has a compression spring assembly 34 for returning the valve spool 6 to its illustrated neutral or middle position. The illustrated compression spring extends between two cap parts 36, 38, of which one or first cap part 36 is arranged stationarily in the end part 32 and the further or second cap part 38 can be moved toward the first cap part 36 against the action of the compression spring. For the travel movement of the second cap part 38, the second end cap 38 is in abutment with the free left end face of the valve spool 6 via a flange. The second cap part 38 can furthermore be guided in a longitudinally displaceable manner in the cap part 36 using a pin guide 40 via an opening in the cap part 36. The free end of the displacement pin in conjunction with the inside wall of the cap-shaped end part 32 constitutes a stop or a travel limiter for the left side of the valve spool 6.

Arranged on the right-hand side of the end face of the valve housing 2 is a further, second end part 42, which is equipped with two independent pilot valves 44 for actuating the valve. A section of the valve spool 6 itself that is narrower in diameter engages with the second end part 42. The second end part 42 is equipped with a manually adjustable stop device 46 such that the maximum stroke of the valve spool 6 can be limited accordingly. Furthermore, a swiveling crank drive 48 engages with the free end area of the valve spool 6, on the right-hand side thereof, in order to enable an emergency actuation by hand should the need arise. The end parts 40, 42 are components of the valve housing 2 of the valve according to the invention.

The valve assembly described in the preceding is disclosed in the post-published document DE 10 2016 011 860.1 of the Patent Holder such that the design itself shall not be discussed in any further detail here. In this context, it should merely be mentioned that the pressure supply port P can be supplied directly with the fluid pressure of a hydraulic pump. However, according to the aforementioned post-published patent document, the pressure supply port P could also be connected to the pressure-supplying port of an individual pressure compensator, as shown by way of example in FIG. 1 of this property right.

As FIG. 2 in particular shows, the essentially cylindrical valve spool 6 is traversed, at least in part, along its center or longitudinal axis by a longitudinal channel 50 in the nature of a drilled hole. Viewed toward FIG. 2, the left end of the longitudinal channel 50 opens into the free end face of the valve spool 6 and is closed in this area in a media-tight manner by a sealing plug assembly 52. On its right side, the longitudinal channel 50 opens into a blind hole inside the valve slide 6. There are three cross channels 54, 56 and 58 arranged and extending transversely to and opening into this longitudinal channel 50 for the passage of fluid. At their free ends, these cross channels 54, 56, 58 open on opposite sides at the surface of the valve spool 6. The lower free end 59 of the corresponding cross channel 54, 56, 58 exits of the valve spool as shown in FIG. 1. For a better display, the valve spool 6 in FIG. 1 is depicted as turned slightly toward the observer compared to the illustration in FIG. 2. Viewed toward the figures, in the middle or neutral position of the valve spool 6 the left cross channel 54 opens, with an approximately 50 percent overlap in each case, into the right wall section 20 of the fluid chamber 22 and into the wall parts adjacent thereto on the valve housing 2. Viewed toward FIG. 2, the two opposite free ends of the further, middle cross channel 56 open at an overlap of approximately 50 percent each into the left wall section 18 of the control chamber 12 and into the wall parts adjacent thereto of the valve housing 2. 50 percent of the two opposite free ends of the rightmost cross channel 58 in the viewing direction also open into the right wall section 20 of the right fluid chamber 24 and into the wall parts of the valve housing 2 adjacent thereto of the valve housing 2, which delimit the wall section 20 to the right. The wall sections 18 thus form cylindrical chambers, which merge seamlessly into the control chambers 8, 10 and encompass the valve spool 6 with the same radial spacing.

In the lower area of the valve housing 2, the cross channels 54 and 58 then open into the right left annular section 26 as part of the associated wall sections 20 of the fluid chambers 22 and 24, in the area of the return ports T1 and T2. The wall sections 20 with the associated annular sections 26 furthermore surround the valve spool 6 at a predefinable constant radial spacing, except for where the return ports T1, T2 engage with the valve housing 2. One or first type of control diaphragm or gap 60, 62 and 64 is formed at the point where the corresponding cross channel 54, 56, 58 transitions into the adjacent wall parts of the valve housing 2. Depending upon the travel direction of the valve spool 6, the respective control diaphragms or gaps 60, 62, 64 widen or narrow, respectively, with regard to their free diameters. The respective control diaphragms or gaps 60, 62, 64 then form a type of barrier device, which impedes the flow of the fluid such as hydraulic fluid, which is initially cold at the start of operation, from the pressure supply port P via the cross channel 62 into the longitudinal channel 50 and from there back to the return ports T1 and T2 via the corresponding cross channels 54 and 58 serving as outlets.

Even if the valve is not in operation, as depicted in FIGS. 1 and 2, and the valve spool 6 has assumed its middle or neutral position shown therein, the barrier device can still be used to heat first the interior of the valve spool 6 and then the whole valve spool 6 using a relatively low slippage at the pressure supply port P with the frictional heat arising at the illustrated control diaphragms or gaps 60, 62, 64. The frictional heat prevents the valve spool 6 from sticking and jamming in the longitudinal guide 4 during operation of the valve under cold conditions. In the frictional heat-generating position of the valve spool 6, the valve spool 6 is in its left (viewed toward the figures) stop position with its free end in abutment on the cap part 38.

Viewed toward the figures and if the valve spool 6 is slid to the left, for example, the control grooves 30 arranged on the left side in the area of the utility port B come into fluidic connection with the control chamber 12 with the pressure supply port P conducting fluid at a predefinable pressure, to the effect that the utility port B, with its connected hydraulic consumer, is then supplied with fluid via its control chamber 10. Any return-flowing fluid originating from the hydraulic consumer is then discharged, via the utility port A and the left control chamber 8 and by the control grooves 30 arranged on the left side in the valve spool 6, into the left fluid chamber 22, from where it is then supplied to the return port T1. In the relevant valve position, the further return port T2 is then closed off from the adjacently arranged utility port B. With the relevant travel movement of the valve slide 6, the control diaphragms or gaps 60, 64 at the return ports T1 and T2, respectively, are widened with respect to their free diameters and the free cross section of the control diaphragm or gap 62 at the pressure supply port P is narrowed such that the frictional heat decreases at the diaphragms or gaps 60, 64 and increases at the diaphragm or gap 62 until the latter is completely closed off from the adjacent housing parts of the valve housing. Preferably preheated fluid then flows in the return circuit from the utility port A via the fluid chamber 22 to the return port T1, specifically via the cross channel 54, which is narrowed with respect to the longitudinal channel 50 to the effect that the fluid, even in the return circuit, can still be heated further by frictional heat.

As explained, during this process the return port 2 remains closed such that no heating within the fluid occurs in this area. With a rightwards travel direction of the valve spool 6, the relationships are reversed to the effect that the pressure supply port P then supplies the utility port A via the corresponding associated control grooves 30 and the utility port B is then fluidically connected to the return port T2. In this case the middle cross channel 56, with the control diaphragm or gap 62 fully opened, is supplied via the pressure supply port P with fluid via the control chamber 12 and the two further control diaphragms or gaps 60 and 64 move to close their free cross sections. Until then the barrier device according to the invention continues to function via the described channel routing in conjunction with the longitudinal channel 50, then heating the fluid by friction in the area of the diaphragms or gaps 60 and 64. If the diaphragms 60 and 64 are completely closed and the diaphragm or gap 62 is completely open, the reduced cross section of the cross channel 56 at the pressure supply port P still results in a reduced flow rate with increased resistance, i.e., frictional heat is generated in the fluid at this point.

In summary, it can therefore be concluded that the actual heating function is implemented via said bypass diaphragms or gaps 60, 62, 64 in the valve spool piston 6, to which end the preferably steady-state pressure at the pressure port P is connected to the two tank channels T1, T2 in a type of bypass. When the valve is actuated in the manner described so as to move it out of its illustrated closed middle position, the bypass, as explained, is closed for both actuation directions of the valve spool 6. With normal actuation of the valve, in other words in pressurizing the corresponding utility port A or B, there is consequently no longer any direct slippage which, after having flowed through the barrier device, is supplied with the one type of control diaphragms or gaps 60, 62, 64. A pressure that is preferably settled by a (not shown) pressure compensator at the pressure supply port P has the advantage that the size in the closed middle position of the valve, in which the utility ports A, B are not pressurized, is defined such that the slippage for heating does not depend on the pump pressure at the pressure supply port P. Because of the small size of the aforesaid diaphragms or gaps 60, 62, 64 with regard to the maximum free cross sections thereof, during the heating of the fluid during operation there is hardly any dependency on the viscosity of the fluid and consequently on the temperature. Because the flow rate via the barrier device and through the connected channels P and T1 and T2 is uniform, a uniform heating of the valve block, over the entire extension thereof, can be assumed. This is without parallel in the prior art.

While one embodiment has been chosen to illustrate the invention, it will be understood by those skilled in the art that various changes and modifications can be made therein without departing from the scope of the invention as defined in the claims.

The invention claimed is:

1. A valve, comprising:
a valve housing with a first utility port, a pressure supply port and first and second return ports in the valve housing; and
a valve spool being guided in the valve housing for longitudinal displacement and selectively controlling transporting a heatable fluid though the valve housing between the first utility port, the pressure supply port and the first and second return ports, the valve spool being positionable in the valve housing in a neutral position in which the pressure supply port is separated from the first utility port and in which the heatable fluid is conveyed from the pressure supply port via a heat-emitting connection in the valve spool to the first and second return ports as slippage, with the heatable fluid conveyed from the pressure supply port to via the heat-emitting connection to the first and second return ports being capable of serving as a heat source in areas of the valve spool.

2. A valve according to claim 1 wherein
the heatable fluid is hydraulic fluid.

3. A valve according to claim 1 wherein
the slippage is heatable by a barrier in the valve housing, the barrier forming a resistance to fluid flow through the valve housing transferring heat generated by friction to the heatable fluid entering and exiting the valve spool.

4. A valve according to claim 3 wherein
the barrier comprises first control gaps having free cross sections in control modes resulting from a closing motion of the valve spool relative to the valve housing in at interfaces of the valve spool and the valve housing at the pressure supply port and the first and second return ports in which the heat-emitting connection in the valve spool opens.

5. A valve according to claim 4 wherein
with increasing of the free diameter cross section of the first control gap at the pressure supply connection and with the free diameter cross sections of the first control gaps at the first and second return ports simultaneously narrowing, a second control gap has a free cross section in a control mode resulting from the closing motion of the valve spool relative the valve housing at the first utility port with a flow rate from the pressure supply port to the first utility port increasing.

6. A valve according to claim 5 wherein
the second control gap comprises two opposite groups of control grooves being on an outer perimeter of the valve spool, extending from a circumferential annular recess in the valve spool and tapering toward ends of the control grooves spaced from the circumferential annular recess.

7. A valve according to claim 5 wherein
the valve housing has a second utility port; and
the second control gap is also at the second utility port.

8. A valve according to claim 4 wherein
the first control gap comprises recesses permanently connected in fluid communication with the pressure supply port and the first and second return ports, the recesses being in the valve housing and being covered by the valve spool.

9. A valve according to claim 4 wherein
the first control gap at the pressure supply port closes and opens, respectively, upon opening and closing of the first control gaps at the first and second return ports.

10. A valve according to claim 1 wherein
the heat-emitting connection in the valve spool comprises a continuous longitudinal channel connected to and connecting cross channels extending toward and to the pressure supply port and the first and second return ports.

11. A valve according to claim 1 wherein
the valve housing has a second utility port;
the valve spool separating the first and second utility ports from the pressure supply port and from the first and second return ports from fluid communication in the neutral position of the valve piston, the first and second utility ports being associated with the first and second return ports, respectively.

* * * * *